United States Patent
Olsen, III et al.

(10) Patent No.: US 8,719,183 B2
(45) Date of Patent: *May 6, 2014

(54) GEOFENCED BASED BACK-UP LIMITS

(71) Applicant: United Parcel Service of America, Inc., Atlanta, GA (US)

(72) Inventors: John A. Olsen, III, Cumming, GA (US); Mark J. Davidson, Alpharetta, GA (US)

(73) Assignee: United Parcel Service of America, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/765,241

(22) Filed: Feb. 12, 2013

(65) Prior Publication Data

US 2013/0154817 A1 Jun. 20, 2013

Related U.S. Application Data

(63) Continuation of application No. 13/403,433, filed on Feb. 23, 2012, now Pat. No. 8,407,152, which is a continuation of application No. 12/554,158, filed on Sep. 4, 2009, now Pat. No. 8,380,640, which is a continuation-in-part of application No. 12/553,191, filed on Sep. 3, 2009.

(60) Provisional application No. 61/094,194, filed on Sep. 4, 2008.

(51) Int. Cl.
*G06Q 30/00* (2012.01)

(52) U.S. Cl.
USPC ............................ 705/330; 705/337; 410/156

(58) Field of Classification Search
USPC ........................................................ 705/330
See application file for complete search history.

(56) References Cited

U.S. PATENT DOCUMENTS

| 4,945,759 A | 8/1990 | Krofchalk et al. |
| 5,440,288 A | 8/1995 | Gottlieb et al. |

(Continued)

FOREIGN PATENT DOCUMENTS

| JP | 5077750 A | 3/1993 |
| WO | WO 2005/069203 | 7/2005 |

(Continued)

OTHER PUBLICATIONS

United States Patent and Trademark Office, Office Action for U.S. Appl. No. 13/753,826, Jul. 8, 2013, 12 pages, USA.

(Continued)

*Primary Examiner* — John Hayes
*Assistant Examiner* — David J Clark
(74) *Attorney, Agent, or Firm* — Alston & Bird LLP

(57) ABSTRACT

A computer system that is configured to: (A) define a geofence surrounding a geographic area; (B) gather information associated with the geofenced area; and (C) assign one or more parameters to the geofenced area based on the information gathered, wherein at least one of the assigned parameters is used to monitor the performance of a delivery vehicle driver while the delivery vehicle driver is operating a delivery vehicle within the geofenced area. In particular embodiments, the parameters include a backup limit defining a number of times a delivery vehicle operating within the geofenced area is permitted to back up while operating the delivery vehicle within the geofenced area (e.g., during a particular delivery cycle). In other embodiments, the parameters include a maximum speed limit for the geofenced area. The system may be adapted to automatically generate an alert in response to the delivery vehicle operating outside of the defined parameters.

15 Claims, 5 Drawing Sheets

(56) References Cited

U.S. PATENT DOCUMENTS

| | | |
|---|---|---|
| 5,557,522 A | 9/1996 | Nakayama et al. |
| 5,928,291 A | 7/1999 | Jenkins et al. |
| 6,092,021 A | 7/2000 | Ehlbeck et al. |
| 6,181,994 B1 | 1/2001 | Colson et al. |
| 6,246,931 B1 | 6/2001 | Shinogi |
| 6,253,129 B1 | 6/2001 | Jenkins et al. |
| 6,306,063 B1 | 10/2001 | Horgan et al. |
| 6,330,499 B1 | 12/2001 | Chou et al. |
| 6,462,675 B1 | 10/2002 | Humphrey et al. |
| 6,498,986 B1 | 12/2002 | Kurtzberg et al. |
| 6,525,672 B2 | 2/2003 | Chainer et al. |
| 6,594,579 B1 | 7/2003 | Lowrey et al. |
| 6,604,033 B1 | 8/2003 | Banet et al. |
| 6,611,740 B2 | 8/2003 | Lowrey et al. |
| 6,636,790 B1 | 10/2003 | Lightner et al. |
| 6,732,031 B1 | 5/2004 | Lowrey et al. |
| 6,819,988 B2 | 11/2004 | Dietz et al. |
| 6,847,871 B2 | 1/2005 | Malik et al. |
| 6,947,827 B2 | 9/2005 | Fuse et al. |
| 6,975,998 B1 | 12/2005 | Jones |
| 7,146,264 B2 | 12/2006 | Bates et al. |
| 7,216,037 B2 | 5/2007 | Graulich et al. |
| 7,299,125 B2 | 11/2007 | Marks et al. |
| 7,317,975 B2 | 1/2008 | Woolford et al. |
| 7,418,361 B2 | 8/2008 | Yun |
| 7,480,551 B1 | 1/2009 | Lowrey et al. |
| 7,760,137 B2 | 7/2010 | Martucci et al. |
| 8,380,640 B2 * | 2/2013 | Olsen et al. ............. 705/330 |
| 8,407,152 B2 * | 3/2013 | Olsen et al. ............. 705/330 |
| 8,423,287 B2 | 4/2013 | Davidson et al. |
| 2002/0147654 A1 | 10/2002 | Kraisser et al. |
| 2003/0004747 A1 | 1/2003 | Burton |
| 2003/0098786 A1 | 5/2003 | Bishop |
| 2004/0039504 A1 | 2/2004 | Coffee et al. |
| 2004/0183673 A1 | 9/2004 | Nageli |
| 2006/0055564 A1 | 3/2006 | Olsen et al. |
| 2006/0109106 A1 | 5/2006 | Braun |
| 2006/0142934 A1 | 6/2006 | Kim |
| 2006/0145837 A1 | 7/2006 | Horton et al. |
| 2006/0178812 A1 | 8/2006 | Affleck et al. |
| 2006/0235739 A1 | 10/2006 | Levis et al. |
| 2006/0238340 A1 | 10/2006 | Harvey |
| 2006/0266936 A1 | 11/2006 | Yun |
| 2006/0271246 A1 | 11/2006 | Bell et al. |
| 2006/0282277 A1 | 12/2006 | Ng |
| 2007/0239346 A1 | 10/2007 | Hawkins et al. |
| 2008/0024323 A1 | 1/2008 | Kadaba |
| 2008/0040182 A1 | 2/2008 | Wegner et al. |
| 2008/0055154 A1 | 3/2008 | Martucci et al. |
| 2008/0133120 A1 | 6/2008 | Romanick |
| 2008/0162034 A1 | 7/2008 | Breen |
| 2009/0045924 A1 | 2/2009 | Roberts, Sr. et al. |
| 2009/0076933 A1 | 3/2009 | Park et al. |
| 2009/0079555 A1 | 3/2009 | Aguirre De Carcer et al. |
| 2009/0210140 A1 | 8/2009 | Short, III et al. |
| 2009/0216600 A1 | 8/2009 | Hill |
| 2009/0243883 A1 | 10/2009 | Simon |
| 2009/0296990 A1 | 12/2009 | Holland et al. |
| 2009/0319341 A1 | 12/2009 | Berkobin et al. |
| 2010/0076968 A1 | 3/2010 | Boyns et al. |
| 2011/0106370 A1 | 5/2011 | Duddle et al. |

FOREIGN PATENT DOCUMENTS

| | | |
|---|---|---|
| WO | WO 2006/065492 | 6/2006 |
| WO | WO 2007/104982 A2 | 9/2007 |

OTHER PUBLICATIONS

United States Patent and Trademark Office, Office Action for U.S. Appl. No. 12/553,191, Aug. 20, 2013, 21 pages, USA.
International Search Report and Written Opinion from International Application No. PCT/US09/04971 mailed Jan. 29, 2010.
International Search Report and Written Opinion from International Application No. PCT/US09/56048 received Jun. 24, 2010.
International Search Report and Written Opinion from International Application No. PCT/US2009/004978 mailed Jan. 12, 2010.
International Search Report and Written Opinion from International Application No. PCT/US2009/056063 mailed Jan. 12, 2010.
Non-Final Office Action from U.S. Appl. No. 12/554,146 dated Jan. 13, 2012.
Office Action dated Feb. 6, 2012, for U.S. Appl. No. 12/553,318, filed Sep. 3, 2009.
Non-Final Office Action from U.S. Appl. No. 12/553,191 dated Dec. 22, 2011.
Office Action dated Apr. 12, 2012, from U.S. Appl. No. 12/553,191, filed Sep. 3, 2009.
Notice of Allowance dated Apr. 27, 2012, from U.S. Appl. No. 12/553,318, filed Sep. 3, 2009.
Office Action dated Jun. 22, 2012 from U.S. Appl. No. 12/554,158, filed Sep. 4, 2009.
Office Action dated Jun. 8, 2012 from U.S. Appl. No. 12/554,146, filed Sep. 4, 2009.
United States Patent and Trademark Office, Office Action for Application No. 13/403,433, dated Aug. 2, 2012, 20 pages, USA.
United States Patent and Trademark Office, Office Action for U.S. Appl. No. 13/491,235, dated Sep. 7, 2012, 8 pages, USA.
United States Patent and Trademark Office, Notice of Allowance and Fees Due for U.S. Appl. No. 13/491,235, dated Nov. 20, 2012, 6 pages, USA.
United States Patent and Trademark Office, Notice of Allowance and Fee(s) Due for U.S. Appl. No. 13/403,433, mailed Nov. 20, 2012, 18 pages, USA.
United States Patent and Trademark Office, Notice of Allowance and Fee(s) Due for U.S. Appl. No. 12/554,158, mailed Dec. 6, 2012, 15 pages, USA.
United States Patent and Trademark Office, Notice of Allowance and Fee(s) Due for U.S. Appl. No. 12/554,146, mailed Dec. 7, 2012, 24 pages, USA.
United States Patent and Trademark Office, Notice of Allowance and Fee(s) Due for U.S. Appl. No. 13/491,235, mailed Dec. 17, 2012, 6 pages, USA.
United States Patent and Trademark Office, Office Action for U.S. Appl. No. 13/088,906, mailed Dec. 18, 2012, 25 pages, USA.
United States Patent and Trademark Office, Response to Rule 312 Communication for U.S. Appl. No. 13/403,433, mailed Jan. 18, 2013, 4 pages, USA.
United States Patent and Trademark Office, Response to Rule 312 Communication for U.S. Appl. No. 13/491,235, mailed Jan. 22, 2013, 3 pages, USA.
United States Patent and Trademark Office, Office Action for U.S. Appl. No. 12/553,191, mailed Jan. 10, 2013, 21 pages, USA.
United States Patent & Trademark Office; Office Action for U.S. Appl. No. 13/753,826, mailed Mar. 26, 2013, 8 pages, USA.
United States Patent & Trademark Office; Office Action for U.S. Appl. No. 13/088,906, dated Apr. 10, 2013, 17 pages, USA.
United States Patent and Trademark Office, Notice of Allowance for U.S. Appl. No. 13/753,826, mailed Oct. 17, 2013, 8 pages, USA.

* cited by examiner

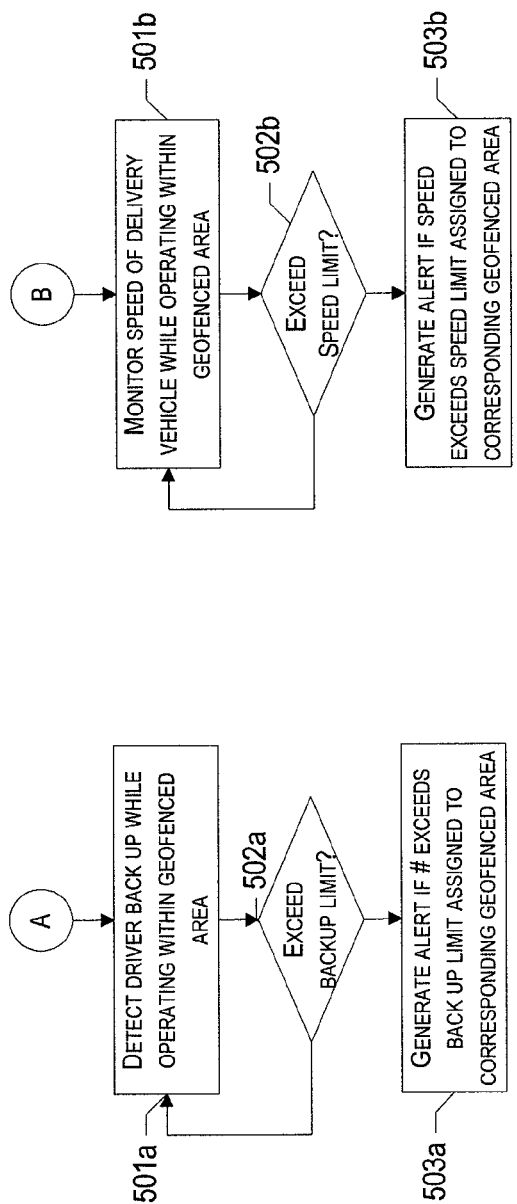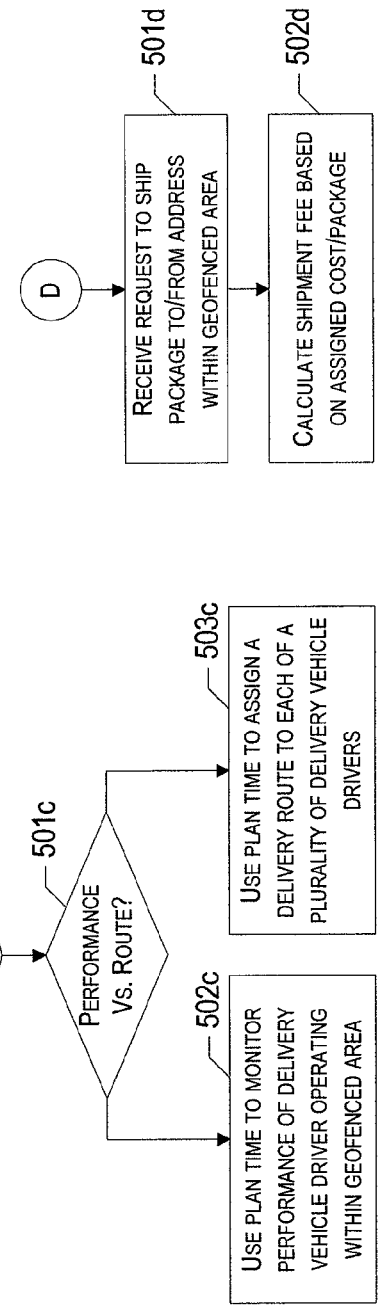

GEOFENCED BASED BACK-UP LIMITS

CROSS-REFERENCE TO RELATED APPLICATIONS

This application is a continuation of U.S. application Ser. No. 13/403,433 filed on Feb. 23, 2012, which is a continuation of U.S. application Ser. No. 12/554,158 filed on Sep. 4, 2009, which is a continuation-in-part of U.S. application Ser. No. 12/553,191 filed on Sep. 3, 2009, which claims priority to Application No. 61/094,194 filed Sep. 4, 2008, which are hereby incorporated herein in their entirety by reference.

BACKGROUND

Delivery vehicle driver safety and efficiency are paramount objectives for transportation companies. Accordingly, there is an ongoing need to develop new technologies to enhance driver safety and efficiency.

BRIEF SUMMARY

In accordance with one aspect, a system comprising one or more processors and one or more memory storage areas is provided. In one embodiment, the system is configured to (1) associate a back-up limit with a geofenced area, the back-up limit indicating the number of times a vehicle is permitted to back up while operating within the geofenced area; (2) receive data collected in association with a vehicle, the data collected during operation of the vehicle within the geofenced area; and (3) determine, based at least in part on the data collected, whether the back-up limit has at least been reached in the geofenced area.

In accordance with another aspect, a method is provided. In one embodiment, the method comprises (1) associating a back-up limit with a geofenced area, the back-up limit indicating the number of times a vehicle is permitted to back up while operating within the geofenced area; (2) receiving data collected in association with a vehicle, the data collected during operation of the vehicle within the geofenced area; and (3) determining based at least in part on the data collected, whether the back-up limit has at least been reached in the geofenced area.

In accordance with another aspect, a computer program product is provided. The computer program product may comprise at least one computer-readable storage medium having computer-readable program code portions stored therein, the computer-readable program code portions comprising executable portions configured to (1) associate a back-up limit with a geofenced area, the back-up limit indicating the number of times a vehicle is permitted to back up while operating within the geofenced area; (2) receive data collected in association with a vehicle, the data collected during operation of the vehicle within the geofenced area; and (3) determine, based at least in part on the data collected, whether the back-up limit has at least been reached in the geofenced area.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIGS. 4 and 5A-5D are flow charts illustrating the process of assigning different parameters to a geofenced area and using the parameters in accordance with embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements Like numbers refer to like elements throughout.

Overall System

Figure 1:
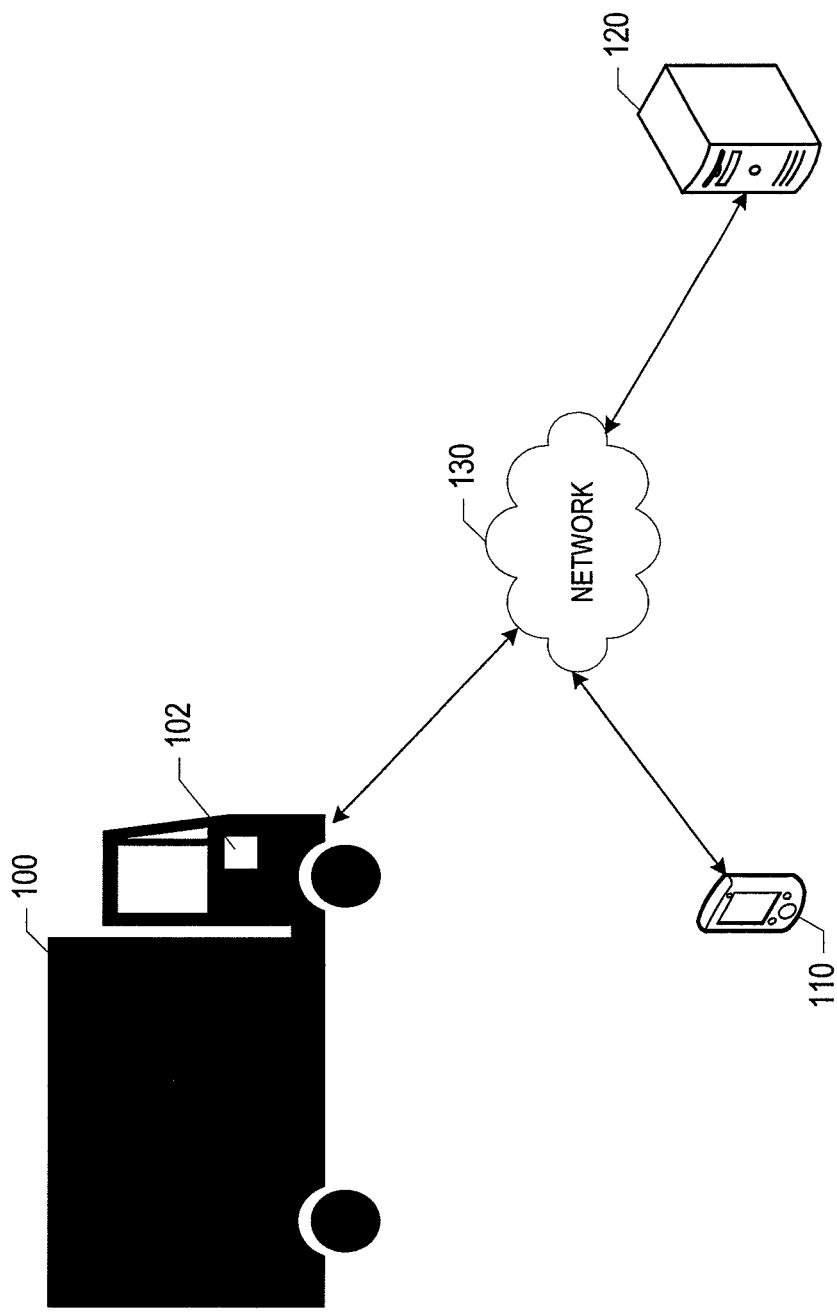
FIG. 1 is a block diagram of one type of system for use in various embodiments of the present invention.

Referring to FIG. 1, an illustration of one type of system for use in various embodiments of the present invention is provided. As shown in FIG. 1, the system may include one or more delivery vehicles 100 responsible for the pickup and/or delivery of a plurality of packages within a particular delivery area. According to one embodiment, a telematics device 102 may be included within, or otherwise associated with, each delivery vehicle 100 for the purpose of collecting, time-stamping and/or storing vehicle sensor data from a plurality of sensors (not shown) also included within, or otherwise associated with, the delivery vehicle 100. As discussed in more detail below with regard to FIG. 2, collected and time-stamped vehicle sensor data may include, for example, information or data associated with the vehicle's door, ignition, oil pressure, temperature, speed, location, and/or the like.

In one embodiment, the telematics device 102 may transmit some or all of the telematics data, via any suitable wired or wireless communication network 130, to a portable data acquisition device 110 (e.g., cellular telephone, personal digital assistant (PDA), laptop, etc.) operated by a driver associated with the delivery vehicle 100. The portable data acquisition device 110 may, in turn, transmit, via the same or different communication network 130, some or all of the received data to a central server 120, or similar network entity or mainframe computer system. According to one embodiment, the telematics device 102 may further (or alternatively) transmit some or all of the telematics data directly to the central server 120, via the same or different communication network 130. As discussed in more detail below with regard to FIGS. 3 and 4, in response to receiving: (A) the telematics data from the telematics device 102 and/or the portable data acquisition device 110; and/or (B) data received from other systems or devices operating in connection with the overall system, the central server 120 may use the data received to assign one or more parameters to each of a plurality of geofenced delivery areas. These parameters may thereafter be used to monitor safety within the geofenced area, schedule delivery of a package within the geofenced area, and/or the like.

According to embodiments of the present invention, the communication network 130 may be capable of supporting communication in accordance with any one or more of a number of second-generation (2G), 2.5G and/or third-generation (3G) mobile communication protocols or the like. More particularly, the network 130 may be capable of supporting communication in accordance with 2G wireless communication protocols IS-136 (TDMA), GSM, and IS-95 (CDMA). Also, for example, the network 130 may be capable of supporting communication in accordance with 2.5G wireless communication protocols GPRS, Enhanced Data GSM Environment (EDGE), or the like. In addition, for example, the network 130 can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, the telematics device 102 and portable data acquisition device 110 may be configured to communicate with one another in accordance with techniques such as, for example, radio frequency (RF), Bluetooth™, infrared (IrDA), or any of a number of different wireless networking techniques, including Wireless LAN (WLAN) techniques.

Although the telematics device 102, portable data acquisition device 110, and central server 120 are illustrated in FIG. 1 as communicating with one another over the same network 130, these devices may likewise communicate over separate networks. For example, while the telematics device 102 may communicate with the portable data acquisition device 110 over a wireless personal area network (WPAN) using, for example, Bluetooth techniques, the telematics device 102 and/or portable data acquisition device 110 may communicate with the central server 120 over a wireless wide area network (WWAN), for example, in accordance with EDGE, or some other 2.5G wireless communication protocol.

According to one embodiment, in addition to receiving telematics data from the telematics device 102, the portable data acquisition device 110 may be further configured to collect and transmit telematics data on its own. For example, according to one embodiment, the portable data acquisition device 110 may include a location determining device, such as a Global Positioning System (GPS) device, for providing location information in the form of, for example, latitude and longitude values. In particular embodiments, and as is discussed in more detail below, this location determining device may be used to gather information regarding the location of the driver him- or herself, as opposed to location information associated with the delivery vehicle 100, which may be collected (or determined) by the telematics device 102.

The portable data acquisition device 110 may be, for example, any device associated with a carrier (e.g., UPS, FedEx, or the United States Postal Service (USPS)). In various embodiments, the portable data acquisition device 110 may be capable of receiving data via one or more input units or devices, such as a keypad, touchpad, barcode scanner, radio frequency identification (RFID) reader, interface card (e.g., modem, etc.) or receiver. The portable data acquisition device 110 may further be capable of storing data to one or more volatile or non-volatile memory modules, and outputting the data via one or more output units or devices, for example, by displaying data to the user operating the device 110, or by transmitting data, for example over the communication network 130. One type of portable data acquisition device 110, which may be used in conjunction with embodiments of the present invention is the Delivery Information Acquisition Device (DIAD) presently utilized by UPS.

Telematics Device

Figure 2:
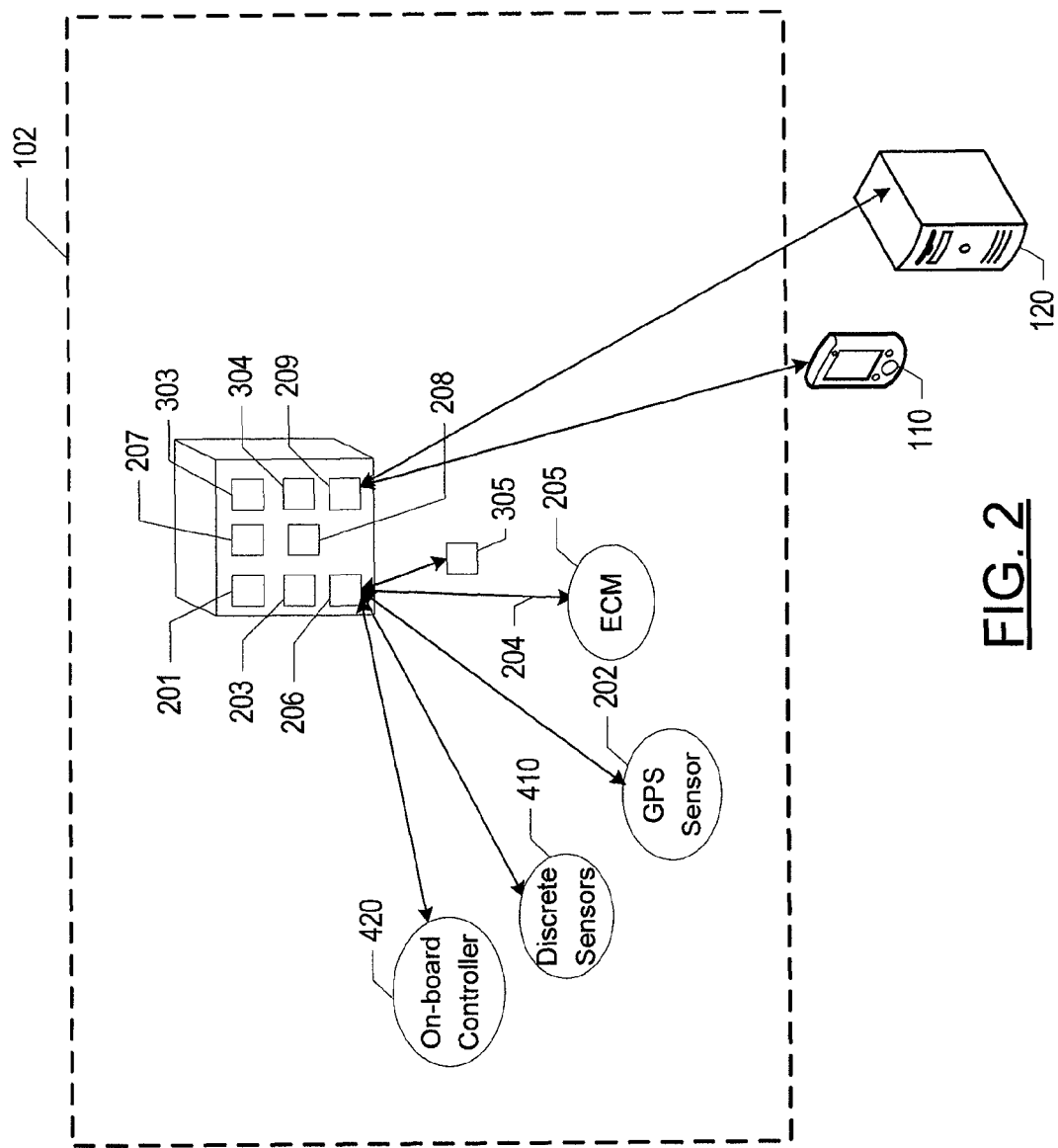
FIG. 2 is a block diagram of a telematics device which may be used to collect data in association with embodiments of the present invention.

Reference is now made to FIG. 2, which provides a more detailed block diagram of a telematics device 102 in accordance with an embodiment of the present invention. As noted above and explained in greater detail below, the telematics device 102 may collect vehicle sensor data and transmit the data to the portable data acquisition device 110 and/or central server 120 via one of several communication methods.

In one embodiment, the telematics device 102 may include some or all of the following components: a processor 201, a location-determining device or sensor 202 (e.g., GPS sensor), a real-time clock 203, J-Bus protocol architecture 204, an electronic control module (ECM) 205, a port 206 for receiving data from discrete sensors in a vehicle 100, a communication port 207 for receiving instruction data, a radio frequency identification (RFID) tag 305, a power source 208, a data radio 209 for communication with a WWAN, a WLAN and/or a WPAN, FLASH, DRAM, and NVRAM memory modules 303, and a programmable logic controller (PLC) 304. In an alternative embodiment, the RFID tag 305, the location sensor 202, and the PLC 304 may be located in the vehicle 100 external to the telematics device 102.

In one embodiment, the location sensor 202, which may be one of several components available in the telematics device 102, may be compatible with a low Earth orbit (LEO) satellite system or a Department of Defense (DOD) satellite system. Alternatively, triangulation may be used in connection with a cellular device associated with a particular vehicle and/or the vehicle's driver and with various cellular towers positioned at various locations throughout a geographic area in order to determine the location of the delivery vehicle 100 and/or its driver. The location sensor 202 may be used to receive position, time, and speed data. The sensor 202 may also allow the telematics device 102 to communicate to the central server 120, or similar network entity or mainframe computer system, via a WWAN. It will be appreciated by those skilled in the art that more than one location sensor 202 may be utilized, and that other similar techniques may likewise be used to collect geo-location information associated with the delivery vehicle 100 and/or its driver.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or sensors 410.

In one embodiment, on/off sensors, which register a voltage amount that corresponds with an on/off condition of the sensor, may be disposed within the vehicle 100 for collecting data. For example, one or more door position sensors may be connected, for example, to the driver side, passenger side, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on.

In one embodiment, variable voltage sensors, which may be used to register variations in voltage, may also be disposed within a vehicle 100 for collecting data. For example, oil pressure sensors may detect the vehicle's oil pressure by registering a particular voltage that corresponds to a particular oil pressure. The voltage of the sensor may increase or decrease proportionately with increases or decreases in oil pressure. Other examples of variable voltage sensors may include vehicle temperature and/or vehicle speed sensors.

In one embodiment, an instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, a radio frequency identification (RFID) tag 305 may be one of several components available for use with the telematics device 102. One embodiment of the RFID tag 305 may include an active RFID tag, which comprises at least one of the following: (1) an internal clock; (2) a memory; (3) a microprocessor; and (4) at least one input interface for connecting with sensors located in the vehicle 100 or the telematics device 102. Another embodiment of the RFID tag 305 may be a passive RFID tag.

One or more RFID tags 305 may be internal to the telematics device 102, wired to the telematics device 102, and/or proximate to the telematics device 102. Each RFID tag 305 may communicate wirelessly with RFID interrogators within a certain geographical range of each other. RFID interrogators may be located external to the vehicle 100 and/or within the portable data acquisition device 110 that can be carried in and out of the vehicle 100 by the vehicle's operator.

In one embodiment, the data radio 209 may be one of several components available in the telematics device 102. The data radio 209 may be configured to communicate with a WWAN, WLAN, or WPAN, or any combination thereof. In one embodiment, a WPAN data radio provides connectivity between the telematics device 102 and peripheral devices used in close proximity to the vehicle 100, such as the portable data acquisition device 110, a local computer, and/or a cellular telephone. As mentioned above, in one embodiment of the invention, a WPAN, such as, for example, a Bluetooth™ network (IEEE 802.15.1 standard compatible) may be used to transfer information between the telematics device 102 and the portable data acquisition device 110. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in the portable data acquisition device 110, or other peripheral device. As discussed above with regard to FIG. 1, and as one of ordinary skill in the art will readily recognize, other wireless protocols exist and can likewise be used in association with embodiments of the present invention.

As discussed above with regard to FIG. 1, in one embodiment, vehicle performance and tracking data collected by the telematics device 102 (i.e., telematics data) may be transmitted via a WPAN to, and stored by, the portable data acquisition device 110 until a communication link can be established between the portable data acquisition device 110 and the central server 120, or similar network entity or mainframe computer system. In one embodiment, the portable data acquisition device 110 may display telematics data for the driver's viewing, which may be helpful in troubleshooting vehicle performance problems and showing delivery route progress and instructions. In an alternative embodiment, the portable data acquisition device 110 may be a hand-held data acquisition device, such as an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

Central Server

Figure 3:
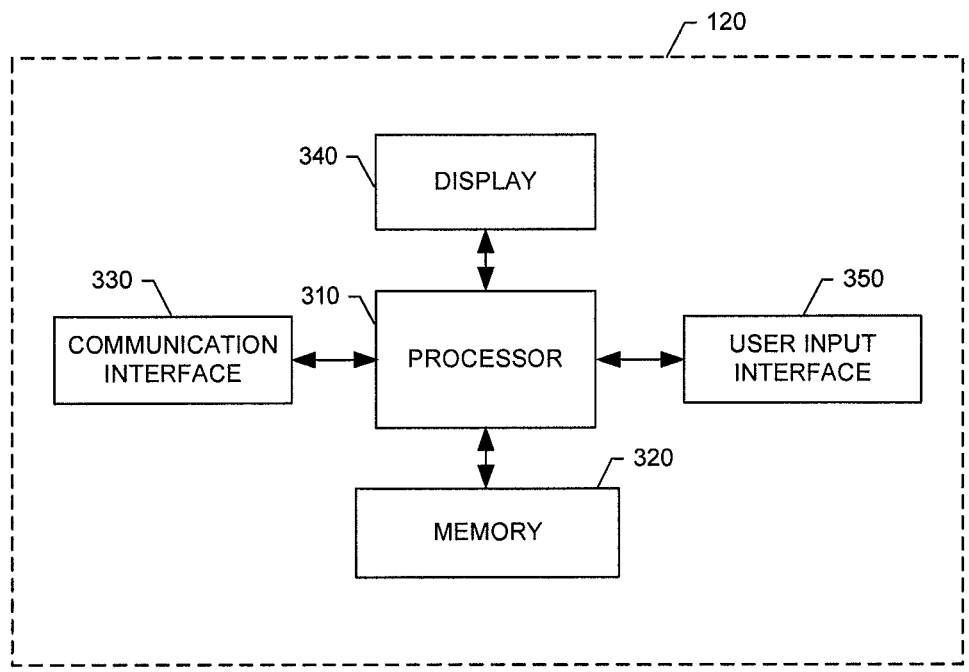
FIG. 3 is a schematic block diagram of an entity capable of operating as a server (e.g., a computer server) in accordance with embodiments of the present invention.

Referring now to FIG. 3, a block diagram of an entity capable of operating as the central server 120, or similar network entity, is shown in accordance with one embodiment of the present invention. The entity capable of operating as the central server 120 includes various means for performing one or more functions in accordance with embodiments of the present invention, including those more particularly shown and described herein. It should be understood, however, that one or more of the entities may include alternative means for performing one or more like functions, without departing from the spirit and scope of the present invention.

As shown, the entity capable of operating as the central server 120 can generally include means, such as a processor 310 for performing or controlling the various functions of the entity. For example, according to one embodiment of the present invention, the processor 310 may be configured to perform the operations discussed in more detail below with regard to FIG. 4 for assigning various parameters to a geofenced area, wherein the parameters may thereafter be used to monitor performance, assist in providing a delivery route, more accurately price the pick-up and delivery of a package within the geofenced area, and/or the like. In particular, according to one embodiment, the processor 310 may be configured to first define one or more geographic areas within which a package may be picked up or delivered, and then define a geofence surrounding each geographic area. The processor 310 may further be configured to gather information associated with each geofenced area (e.g., by receiving and analyzing the telematics data collected and transmitted by the telematics device 102 and/or the portable data acquisition device 110 while pick-ups and deliveries were being made in that geofenced area), and to assign one or more parameters to each geofenced area. While the foregoing describes a single processor 310, as one of ordinary skill in the art will recognize, the central server 120 may comprise multiple processors operating in conjunction with one another to perform the functionality described herein.

In one embodiment, the processor 310 is in communication with and/or includes memory 320, such as volatile and/or non-volatile memory that stores content, data or the like. For example, the memory 320 typically stores content transmitted from, and/or received by, the entity. Also for example, the memory 320 typically stores software applications, instructions or the like for the processor 310 to perform steps associated with operation of the entity in accordance with embodiments of the present invention. For example, the memory 320 may store applications, instructions, or the like for the processor 310 to perform the steps discussed below with regard to FIG. 4 for assigning various parameters to each of one or more geofenced areas.

In addition to the memory 320, the processor 310 can also be connected to at least one interface or other means for displaying, transmitting and/or receiving data, content or the like. In this regard, the interface(s) can include at least one communication interface 330 or other means for transmitting and/or receiving data, content or the like, as well as at least one user interface that can include a display 340 and/or a user input interface 350. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture. The system of various embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

Defining Geographic and/or Geofenced Areas

Figure 4:
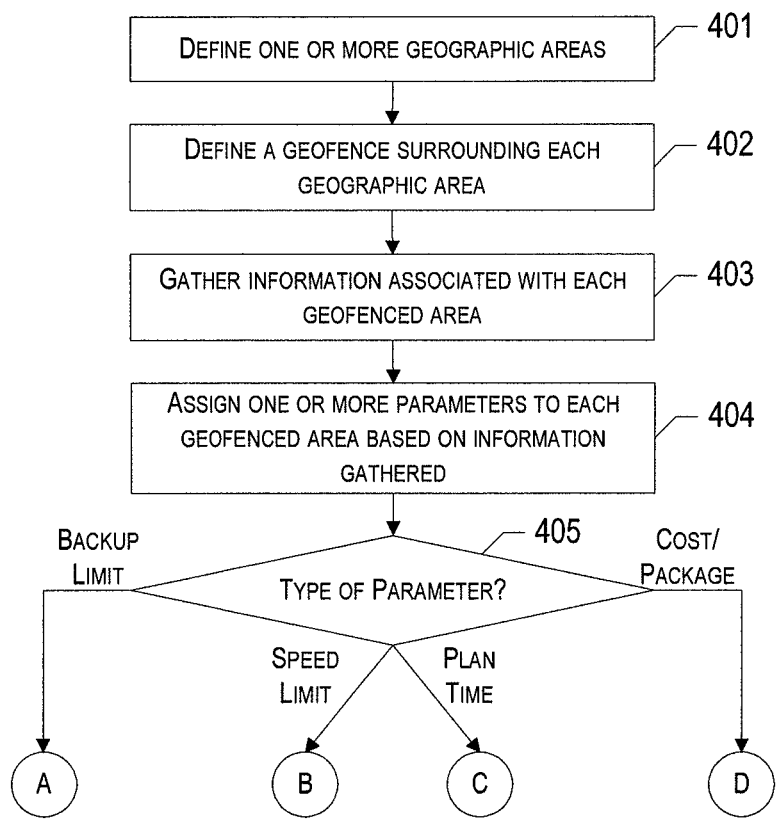

Referring now to FIG. 4, the operations are illustrated that may be taken in order to assign one or more parameters to each of a plurality of geofenced areas, wherein the parameters may be used, for example, to monitor the performance of a delivery vehicle driver operating within the corresponding geofenced area, assist in providing a delivery route for the delivery vehicle driver, more accurately charge for pick-up and/or delivery of a package within the geofenced area, and/or the like. As shown, the process may be begin at Block 401 when a central system, such as the central server 120 and, in one embodiment, a processor 310 or similar means operating on the central server 120, defines one or more geographic areas or regions within which one or more packages may be picked up and/or delivered. Each geographic area may, for example, represent an area in which a single driver may be capable of handling all package pick ups and deliveries within a given delivery cycle (e.g., one eight-hour day). In one embodiment, the geographic areas may be defined based on a predefined size requirement (e.g., a new geographic area may occur every 100,000 square feet). Alternatively, the geographic area may be defined based on zoning classifications associated with different geographic areas (e.g., an office park may make up an individual geographic area). In this embodiment, the central system (e.g., the central server 120 and, in one embodiment, the processor 310 or similar means operating on the central server 120) may first download information regarding zoning classifications, for example, from a website operated by a government entity, or some other third-party source.

In another embodiment, the central system may review historic data gathered in association with the deliveries and pickups made within a particular geographic area to determine the area's zoning classification. For example, the package information associated with packages picked up or delivered within a particular geographic area may indicate that the delivery/pickup was "residential" or "commercial," indicating that the geographic area itself should be classified as residential or commercial, respectively.

In another embodiment, one or more of the geographic areas may be defined based on the existence of one or more housing subdivisions, office parks, and/or the like. For example, each housing subdivision, or a combination of two or more abutting housing subdivisions, may make up a defined geographic area. This may depend, for example, on the square footage of each subdivision and/or the number of houses (and, therefore, potential stops) within each subdivision.

In yet another alternative embodiment, one or more of the geographic areas may be defined based on the average number of stops and/or the frequency of stops within certain geographic areas, as determined, for example, based on information gathered regarding past pick ups and deliveries within that geographic area. For example, each geographic area may be limited to a certain number of regular stops.

According to various embodiments of the present invention, a geographic area may overlap or reside wholly within another geographic area. Geographic areas may, for example, be as small as a single delivery/pickup stop or a suite within a commercial building, or as large as an entire town. According to various embodiments, the geographic areas need not be continuous. In other words, a geographic area may specifically exclude an area that would otherwise fall within the geographic area (e.g., such that the geographic area forms a donut or similar shape around the excluded area).

As one of ordinary skill in the art will recognize in light of this disclosure, the geographic areas may be defined based on any number and combination of factors including, but not limited to, those described above. The foregoing examples are, therefore, provided for exemplary purposes only and should not be taken in any way as limiting embodiments of the present invention to the examples provided.

Once the geographic areas have been defined, the central system (e.g., the central server 120 and, in one embodiment, a processor 310 or similar means operating on the central server 120) may, at Block 402, define a geofence surrounding each of the defined geographic areas, such as a neighborhood. The geofence may be defined, for example, by the latitude and longitude coordinates associated with various points along the perimeter of the geographic area. Alternatively, the geofence may be defined based on latitude and longitude coordinates of the center, as well as the radius, of the geographic area. The geographic area, and therefore the geofence, may be any shape including, but not limited to, a circle, square, rectangle, an irregular shape, or the like. In addition, it is not necessary that the geofenced areas be the same shape or size. Alternatively, any combination of shapes and sizes may be used in accordance with embodiments of the present invention.

Once the geofence has been defined for a geographic area, the coordinates (or similar means for defining the geofenced areas) may be stored in a database associated with the central system. In addition, the coordinates (or similar means for defining the geofenced area) may be (a) uploaded to the data acquisition device and/or telematics device 102 associated with the driver and delivery vehicle 100, respectively, and (b) assigned to pick up and deliver packages for that area.

Gathering Information about Geographic and/or Geofenced Areas

Next, the central system (e.g., the central server 120 and, in one embodiment, the processor 310 or similar means operating on the central server 120) may gather information in association with each geographic area (Block 403). For example, as discussed above, according to one embodiment, the central system may receive telematics data that has been collected, in real-time, by the telematics device 102 and/or the portable data acquisition device 110, while a driver was operating a delivery vehicle 100 within the corresponding geographic area. The telematics data may include, for example: (1) time data; (2) geographic position data associated with the vehicle 100 and/or the driver (e.g., based on a GPS, or similar, receiver associated with: (A) the vehicle and/or (B) the portable data acquisition device 110 operated by the driver); (3) speed data; (4) distance data (e.g., mileage data); (5) ignition data; (6) data associated with one or more of the doors of the vehicle 100 being opened and/or closed; and/or (7) other data.

The telematics data received may indicate, or be used to calculate, among other things, the time the vehicle entered and/or exited the geofenced area (e.g., based on time and location information associated with the vehicle). This information, along with additional telematics data indicating when the vehicle ignition is turned on and off and/or when a vehicle door is opened and closed, may further indicate the number of stops performed while the vehicle was operated within the geofenced area.

For example, location information received by the location sensor (e.g., GPS sensor) included in the telematics device (or the vehicle itself) may indicate that the delivery vehicle has entered the geofenced area. Once inside the geofenced area, the telematics device may monitor the ignition sensor to determine when the ignition is turned on and off and/or the vehicle's door position sensors to determine when the driver side, passenger side and/or bulkhead door is opened and closed. The collection of this information may be used to determine how many times the delivery vehicle was stopped to make a delivery or pickup (e.g., how many times the ignition was turned off and/or how many times the door(s) were opened) within the geofenced area. If the delivery vehicle enters and exits the geofenced area more than once within a given delivery cycle (e.g., one eight-hour shift), the number of stops made during each visit into the geofenced area may be considered individually and/or combined to determine a total number of stops within the geofenced area during the delivery cycle.

The telematics data received may further indicate, with regard to each stop made within the geofenced area, the amount of time spent and the distance traversed by a delivery vehicle itself and/or the delivery vehicle driver (e.g., the time/distance associated with having the driver walk from the vehicle to a particular dropoff location). In one embodiment, the time spent making a particular delivery may be determined, for example, by taking the difference between the time at which the vehicle's ignition sensor indicates that the vehicle ignition is turned off at the particular stop and the time at which the ignition sensor indicates that the vehicle's ignition is turned back on at the stop. The distance traversed (e.g., walked) by a delivery vehicle driver in association with a delivery/pickup stop may be determined, for example, in one of at least three ways.

First, according to one embodiment of the present invention, the distance traversed by a delivery vehicle driver in association with a delivery/pickup stop may be determined by tracking the driver's location (e.g., using a GPS device associated with the driver or the driver's handheld device) as the driver moves between: (1) the driver's location at the moment the vehicle's ignition is turned off at the particular stop, and (2) his or her location up to the moment when the delivery vehicle's ignition is turned back on at the particular stop.

In a second embodiment, the distance traversed by a delivery vehicle driver in association with a delivery/pickup stop may be determined based, at least in part, on: (1) the location of the vehicle at the moment the vehicle's ignition is turned off (e.g., as determined by the GPS, or similar device in the vehicle); and (2) the location of (e.g., latitude and longitude coordinates associated with) a drop-off location (e.g., a particular door) at that particular stop (e.g., the front door of a particular house). For example, the system may simply calculate the distance between the location of the vehicle and the drop-off location at the particular stop (e.g., along a straight path, or along a particular path of travel). In various embodiments, the latitude and longitude coordinates of a drop off location associated with each of various stops (e.g., the front or side door of a residential home) may have been obtained and stored in memory over time as deliveries/pickups are made to those stops. For example, the location of an electronic device associated with the delivery vehicle driver or the delivery vehicle (e.g., DIAD) may have been captured at the moment the driver indicated that the package was delivered to the recipient or picked up from the shipper. Once gathered, this information may thereafter be used to, among other things, identify the pickup/delivery location for the particular stop and, therefore, the distance traversed by the driver in order to make future pickups/deliveries at that stop.

According to a third embodiment, the distance traversed by a delivery vehicle driver in association with a delivery/pickup stop may be determined based, at least in part, on: (1) the latitude and longitude coordinates associated with the pickup location at a particular stop; and (2) the point on the street segment that is the shortest distance from those latitude and longitude coordinates. This may be done, for example, using the techniques described above.

Alternatively, or in addition, the telematics data may indicate the vehicle's speed at various times and locations within the geofenced area, and/or the number of miles traversed when the vehicle was operated within the geofenced area during, for example, a given delivery cycle (e.g., one eight-hour shift). With regard to the latter, as above, if the delivery vehicle makes multiple visits into the geofenced area during a particular delivery cycle, the mileage driven within the geofenced area during the delivery cycle may be calculated by summing the mileage accumulated during the multiple visits.

Using the aforementioned data received and/or calculated in association with a plurality of delivery vehicles operating within the geofenced area over a certain period of time, the central system (e.g., the central server 120 and, in one embodiment, the processor 310 or similar means operating on the central server 120) may calculate, for example, for a given delivery cycle (e.g., one, eight-hour shift), the average time spent and/or miles traversed within the geofenced area, the average number of stops performed, the average amount of time spent and distance traversed per stop, the average speed conducted, and/or the like. The data received may further be used, for example, to calculate an average speed associated with various segments within different geofenced areas, as well as the average speed of those segments at different times of the day. As one of ordinary skill in the art will recognize, the foregoing examples of types of telematics data collected, as well as calculations which may be preformed based on the data received, are provided for exemplary purposes only and should not be taken in any way as limiting the scope of embodiments of the present invention to the examples provided. In contrast, other types of telematics data may be gathered and other types of calculations may be performed without departing from the spirit and scope of embodiments of the present invention.

Alternatively, or in addition, in order to gather information associated with the geofenced area, the central system (e.g., the central server 120 and, in one embodiment, the processor 310 or similar means operating on the server) may receive zoning information associated with each geofenced area. As noted above, this information may be received, for example, by downloading the information to the central system from a suitable source, such as a government-operated website, or some other third-party source.

In one embodiment, the zoning information received may include, for example, a designation of whether the geographic area as a whole, or sub-areas within the geographic area, are zoned for open space, residential, agricultural, commercial or industrial activities. The zoning information may further indicate, for example, whether a residential area is for single family homes, multi-tenant homes, high-rise apartment buildings, or the like. As also noted above, the zoning information may be determined based on a historical analysis of the information associated with packages picked up and/or delivered within the geofenced areas.

According to one embodiment, the zoning information, either received from a government-operated website or some other third-party source, or determined based on a historical analysis of previous pickups/deliveries made within the area, may be used by the central system (e.g., the central server 120 and, in one embodiment, the processor 310 or similar means operating on the server) to define a zoning classification for the geofenced area. In one embodiment, the zoning classification may have a direct correlation to the government-specified zoning designation (e.g., a geofenced area including only land that has been zoned commercial, may be classified as commercial by the central server 120).

Alternatively, where, for example, the zoning information associated with a particular geofenced area includes multiple different designations, the central system may define a zoning classification that corresponds to the most predominate zoning designation (e.g., a geofenced area including a small area zoned commercial, but a larger area zoned residential, may be classified residential by the central system). The zoning classification defined by the central system may have more or less detail than the government-specified zoning designation (e.g., the government may zone an area residential—single family homes, while the central server 120 may define the zoning classification as merely residential, and vice versa) and/or the zone identification included in the package information provided by the customer.

In yet another embodiment, in order to gather information associated with the geofenced area, the central system (e.g., the central server 120 and, in one embodiment, the processor 310 or similar means operating on the server) may further be configured to receive an indication of the government-assigned speed limit(s) associated with the geofenced area. As above, in various embodiments, this information may be downloaded from a suitable source, such as a government-operated website. As one of ordinary skill in the art will recognize, each geofenced area may have only one, or alternatively multiple, government-assigned speed limit(s) associated therewith.

Entry of Speed Limit Information and Other Information

In one embodiment, information regarding the government-assigned speed limit associated with various street segments within a geofenced area may be continuously gathered and updated by delivery vehicle drivers themselves as they traverse the geofenced area. For example, according to one embodiment, a driver may, as he or she is driving within a particular area, upload the current speed limit each time the speed limit changes in a particular geographical area (including, for example, when the speed limit changes due to a construction zone). This may be done, for example, by having the driver stop his vehicle when he sees a particular speed limit sign, and then having the driver manually enter the speed limit information posted on the sign into a handheld device (e.g., a DIAD), or other computing device, such as an on-board computing device associated with the vehicle.

In other embodiments, the driver's vehicle or handheld device may be equipped with voice recognition software. In such embodiments, the driver may, for example, press a "speed limit input" button on the vehicle's console, or on the driver's handheld device, and then simply say the current speed limit out loud. The speech recognition software then converts the speed limit information that is conveyed verbally by the driver into corresponding digital data and saves the information to memory.

In particular embodiments, rather than pressing a "speed limit input" button to verbally enter speed limit data, the user may issue a specific voice command, such as "enter speed limit information," which is recognized by an on-board computer associated with the vehicle or the user's handheld device. The user may then convey the speed limit information verbally as discussed above.

In particular embodiments, as (or after) the speed limit information is received from the driver, the information is uploaded to a central server. This may be done either substantially in real time (e.g., as the information is being received from the driver), or at a particular time after the information is received from the driver (e.g., after the vehicle returns to a particular location where information stored in the vehicle's on-board computer is to be uploaded to a central server for processing). In particular embodiments, the speed limit information may be linked (e.g., automatically) to the vehicle's location at at least approximately the moment (e.g., at the moment) that the speed limit information was captured by the system or uploaded. For example, if the driver stops the vehicle and inputs a speed limit of "45 mph" into the system at 4:45 pm on Aug. 12, 2009, the system may: (1) retrieve information from GPS sensors on the vehicle or in the driver's handheld device to determine the location of the driver when the driver entered the speed limit information; and (2) save, in memory, an indication that the speed limit at that particular location is 45 mph.

In particular embodiments, the system may be adapted to use the driver's location information to identify the closest street segment to the driver. In various embodiments, the system assumes that the speed limit entered by the driver corresponds to that particular street segment. The system then saves, in the system's memory, data indicating that the speed limit on the particular street segment is the speed limit entered by the driver when the driver was close to, or on, that particular street segment.

As noted above, the vehicle's location at a particular time may be determined using a location sensor, such as a GPS sensor, on the delivery vehicle 100. This may serve to provide accurate, up-to-date speed limit information associated with each segment of each street within a particular geofenced area (or other area).

In yet another embodiment, an average of the actual speed of the driver may be used to estimate the government-assigned speed limit within a particular geographical area. In particular, the speed that the delivery vehicle 100 is being operated within the geofenced area throughout a given period of time may be detected and accumulated. For example, the system may track the average speed of fleet vehicles traveling within a particular geofenced area over a predetermined number of days and use this average speed to estimate the speed limit within the area. In particular embodiments, one or more of the fastest and the slowest times accumulated may be thrown out, and an average may be taken of the remaining speeds in order to provide an estimate of the speed limit within the area.

In various embodiments, the central system (e.g., the central server 120 and, in one embodiment, the processor 310 or similar means operating on the central server 120) may further be configured to gather information associated with the packages picked up and/or delivered within the geofenced area. This information may include, for example, the cost, size, classification (e.g., "residential" or "commercial"), sender, recipient, and/or the like, associated with individual shipments, the overall number of items shipped within a given period of time, and/or the like.

Assigning Parameters to Geographic and/or Geofenced Areas

Turning again to FIG. 4, using the information received, the central system (e.g., the central server 120 and, in one embodiment, the processor 310 or similar means operating on the server) may, at Block 404, assign one or more parameters to each of the geofenced areas. Once assigned, these parameters may be stored in a suitable database, such as the database associated with the central system. In particular embodiments, the parameters may be stored in the central system's database in conjunction with the previously stored geofence coordinates corresponding to the geofenced area. These parameters may thereafter be used, for example, to monitor the performance of a delivery vehicle driver operating within the geofenced area, to assist in providing a delivery route to the delivery vehicle driver, to provide more accurate pricing for the pickup and delivery of packages within the geofenced area, and/or the like. In one embodiment, the parameters may include, for example, a backup limit, speed limit (which may be, for example, a legally binding speed limit or a target maximum speed limit assigned by a non-government entity, such as the owner of a fleet of vehicles operating within the geofenced area), plan time, cost per package and/or the like. These parameters are discussed in greater detail below. Depending upon the parameter assigned, a different set of operations may be performed by the central system. Examples of these operations are illustrated in FIGS. 5A through 5D.

For example, according to one embodiment, a "backup limit," which may refer to the maximum number of times a driver is permitted to back up his or her vehicle 100 while operating the vehicle 100 within the corresponding geofenced area, may be assigned to a particular geofenced area. The maximum number of backups may refer, for example, to the number of backups made within a given delivery cycle (e.g., one, eight-hour shift), a given day, or within each visit to the geofenced area. For the latter, the system may be configured to reset the count of backups for a particular driver each time the driver exits and reenters the geofenced area.

In one embodiment, the backup limit may be defined by the central system (e.g., the central server 120 and, in one embodiment, the processor 310 or similar means operating on the server) based on the zoning classification defined for the geofenced area at Block 403. For example, the backup limit associated with a geofenced area that has been classified "residential" may be less than the backup limit associated with a geofenced area that has been classified "commercial" or "industrial." Accordingly, in one embodiment of the present invention, the central system may access a look-up table that includes various zoning classifications and corresponding permitted numbers of backups in order to assign the appropriate backup limit in a particular situation. Alternatively, or in addition, the backup limit may further be correlated, to some extent, with the average number of stops the driver makes within the geofenced area (e.g., based on the telematics data received and analyzed at Block 403). For example, a first area classified as residential having a higher average number of stops than a second area also classified as residential may have a higher backup limit than the second residential area.

Where, for example, the parameter assigned to the geofenced area is a backup limit (as determined at Block 405), the number of times a driver backs up his or her vehicle 100 while operating within the geofenced area may be monitored (Block 501a), and if it is determined, at Block 502a, that the driver has exceeded the backup limit assigned to the geofenced area within a particular delivery cycle or entry into the geofenced area (depending on how the backup limit is defined, as described above), the central system may generate an alert (Block 503a). In particular, as discussed above, according to one embodiment, part of the telematics data received by the central system (e.g., the central server 120 and, in one embodiment, the processor 310 or similar means operating on the server) from the telematics device 102 may include an indication of when the backing light(s) of the delivery vehicle 100 is turned on and off (e.g., using an on/off sensor). The central system may use this information to determine when the delivery vehicle 100 is backing up and calculate, and/or keep track of, the number of times this is performed within a given delivery cycle (e.g., a single day). If the number of times the user backs up exceeds the backup limit associated with the geofenced area within a particular delivery cycle, a particular visit or entry into the geofenced area, and/or the like, the central system may generate an alert, which may, for example, be transmitted to the portable data acquisition device 110 operated by the driver and output to the driver of the vehicle 100. The portable data acquisition device 110 may output the alert, for example, in the form of an audio and/or visual output (e.g., an audio alarm or a message on a display screen associated with the portable data acquisition device 110). Alternatively, or in addition, the alert may be used to generate a report associated with the driver and stored, for example, on a database associated with the central system.

In an alternative embodiment, the portable data acquisition device 110, instead of the central system, may receive the telematics data indicating when the delivery vehicle 100 is being backed up, and generate an alert when the number of times the delivery vehicle 100 is backed up within a given delivery cycle exceeds the backup limit. In this embodiment, the portable data acquisition device 110 may bypass the central system altogether. In addition, however, the portable data acquisition device 110 may communicate the alert to the central system, so that the central system (e.g., the central server 120 and, in one embodiment, the processor 310 or similar means operating on the server) may store an indication of the alert in the driver's record.

Another example of a parameter that may be assigned to a geofenced area may be a speed limit, or the maximum speed a driver is permitted to reach (e.g., according to an established set of driver performance guidelines) while operating his or her delivery vehicle 100 within the corresponding geofenced area. According to one embodiment, the speed limit assigned to the geofenced area may be defined based on a government-assigned speed limit(s) associated with that geofenced area. For example, where more than one government-assigned speed limit exists within the geofenced area, the speed limit assigned by the central system (e.g., the central server 120 and, in one embodiment, the processor 310 or similar means operating on the server) to the geofenced area may correspond to the lowest government-assigned speed limit, the highest government-assigned speed limit, and/or an average government-assigned speed limit for the area. Where, for example, there is no government-assigned speed limit (e.g., in a parking lot), the central system may assign a default speed limit to the geofenced area (e.g., 10 miles per hour).

Where, for example, the parameter assigned to the geofenced area is a speed limit, the central system (e.g., the central server 120 and, in one embodiment, the processor 310 or similar means operating on the server) may monitor the speed of a delivery vehicle 100 being operated within the geofenced area (Block 501b). In various embodiments, if it is determined, at Block 501b, that the vehicle 100 has exceeded a speed limit associated with the geofenced area (e.g., the speed limit assigned to the geofenced area by the central system, as described above), the central system may generate an appropriate alert (Block 503b). In particular, as above with regard to the backup limit, according to one embodiment, part of the telematics data received by the central system from the telematics device 102 may include an indication of the speed of the delivery vehicle 100. The central system may use this information to monitor whether the delivery vehicle's speed exceeds the speed limit assigned to the geofenced area. If the speed of the delivery vehicle 100 exceeds the speed limit associated with the geofenced area, the central system may generate an alert, which may, for example, be transmitted to the portable data acquisition device 110 operated by the driver of the vehicle 100 and output to the driver, for example, in the form of an audio and/or visual output. Alternatively, or in addition, the alert may communicated to a report associated with the driver and stored, for example, on a database associated with the central system.

In an alternative embodiment, the portable data acquisition device 110, instead of the central system, may receive the telematics data indicating the speed of the delivery vehicle 100, and generate an alert when the speed exceeds the speed limit. In fact, in one embodiment, the portable data acquisition device 110, and not the telematics device 102, may include a speed sensor (e.g., a GPS unit) for monitoring the speed of the driver and, in effect the delivery vehicle 100. In either embodiment, the portable data acquisition device 110 may bypass the central system altogether. In addition, however, the portable data acquisition device 110 may communicate the alert to the central system, so that the central system (e.g., the central server 120 and, in one embodiment, the processor 310 or similar means operating on the server) may store an indication of the alert in the driver's record.

Plan Times

According to another embodiment, a "plan time" may be assigned to each geofenced area. In one embodiment, the plan time associated with a geofenced area may refer to the overall amount of time it is anticipated, or planned, that a delivery vehicle driver will spend within the corresponding geofenced area during a given pick-up/delivery cycle (e.g., within a single day). Alternatively, or in addition, the plan time may refer to the amount of time it is expected that a delivery vehicle driver will spend per package picked up or delivered within the geofenced area. According to one embodiment, this parameter (e.g., plan time per package) may be combined with the average or actual number of packages picked up or delivered within the geofenced area within a given pick-up/delivery cycle to determine the overall plan time associated with the geofenced area.

In either case, the plan time (e.g., the overall plan time or the plan time per package) may be calculated, for example, based, at least in part, on the telematics data received (at Block 403) from the telematics device 102 and/or portable data acquisition device 110 including, for example, the time spent and distance (e.g., mile or kilometers) traversed within the geofenced area by a plurality of delivery vehicles 100 over a period of time, the average time spent and distance traversed (e.g., walked) by the delivery vehicle driver per stop within the geofenced area, the average speed at which the vehicle 100 was operated within the geofenced area and, more specifically, at certain segments within the geofenced area and at certain times of the day.

If a plan time parameter is assigned to the geofenced area (as determined at Block 405), the central system (e.g., the central server 120 and, in one embodiment, the processor 310 or similar means operating on the server) may use the plan time in at least one of two ways, as determined at Block 501c.

In particular, according to one embodiment, the plan time associated with a geofenced area (e.g., the plan time per package picked up or delivered within the geofenced area) may be used to monitor the performance of a delivery vehicle driver operating within the geofenced area (Block 502c). For example, using the schedule of deliveries and pickups to occur within the geofenced area assigned to a particular delivery vehicle driver for a given delivery cycle (e.g., one eight-hour shift) and the plan time associated with the geofenced area (e.g., the amount of time per package), the central system (e.g., the central server 120 and, in one embodiment, the processor 310 operating on the central server 120) may generate a "plan time schedule" associated with the delivery vehicle driver. This plan time schedule may indicate what number of packages the delivery vehicle driver should have picked up or delivered at any given time of day.

For example, assuming the plan time for a particular geofenced area is five minutes per package (or other predetermined time per package), and the driver has been operating within the geofenced area for approximately 25 minutes (or other predetermined time), according to the plan time schedule, the delivery vehicle driver should have picked up or delivered five separate shipments or packages (e.g., 25 minutes divided by five minutes/package). Deviations from the plan time schedule may illustrate how well the delivery vehicle driver is performing. For example, if the delivery vehicle driver has only delivered or picked up three shipments at that point in time, this may indicate that the delivery vehicle driver is not operating as quickly or as efficiently as he or she should. Alternatively, if the delivery vehicle driver has already picked up or delivered six shipments, this may indicate that the delivery vehicle driver is operating more quickly or efficiently than expected. According to one embodiment, the delivery vehicle driver's performance may be reviewed at various times throughout his or her shift and/or at the end of the shift. In the latter instance, the delivery vehicle driver may have been able to make up for lost time and/or waste banked time, such that his or her overall performance is on par with what would be expected given the plan time for that geofenced area.

In another embodiment, the plan time associated with a geofenced area may be used to assign a delivery route to each of a plurality of delivery vehicle drivers (Block 503c). In particular, according to various embodiments, each delivery vehicle driver may be allocated to a single geofenced area, or some combination of two or more geofenced areas, for performing package pickups and deliveries within the allocated area(s). The determination of which and what number of geofenced areas to allocate or assign to the delivery vehicle driver may depend, for example, on the overall plan time associated with the respective geofenced areas (e.g., the amount of time it is expected that the driver will spend within the geofenced area) and/or the plan time per package associated with each geofenced area (e.g., the amount of time it is expected that the driver will spend per package within the geofenced area) in combination with either an average or the actual number of shipments (pickup or delivery) associated with the geofenced area.

For example, where the overall plan time associated with a geofenced area is relatively short, and the overall plan time associated with a nearby geofenced area is similarly short, a single delivery vehicle driver may be allocated to both geofenced areas (e.g., he or she may be responsible for picking up and delivering all shipments associated with the two geofenced areas). Alternatively, where the plan time associated with a geofenced area is relatively large, a delivery vehicle driver may only be allocated this single geofenced area.

In addition to considering the plan time (e.g., overall or per package) associated with a geofenced area, according to various embodiments of the present invention, the distance between each geofenced area, and, in one embodiment, the average speed used to traverse that distance, may likewise be taken into consideration when allocating geofenced areas to delivery vehicle drivers.

Finally, according to yet another embodiment a "cost per package" may be assigned to each geofenced area. In one embodiment, the cost per package may refer to the amount in dollars that is associated with the pickup or delivery of a package within the geofenced area. This parameter, like those discussed above, may be calculated, for example, based at least in part on the telematics data received (at Block 403) from the telematics device 102 and/or portable data acquisition device 110, in combination with other information gathered. For example, according to one embodiment, the cost associated with the pickup or delivery of a package within a geofenced area may be based, at least in part, on: (1) the time spent by the delivery vehicle driver at each stop; (2) the delivery vehicle driver's compensation (e.g., per-hour wage or a portion of the annual salary); (3) the distance traversed in association with each stop; (4) the average distance traversed per unit (e.g., liter or gallon) of fuel (e.g., gasoline) used by the delivery vehicle 100; and/or (5) the average cost per unit of gasoline. Using this information, the central system (e.g., the central server 120 and, in one embodiment, the processor 310 operating on the central server 120) may calculate the average cost (e.g., in Dollars, Euros, or Yen) per stop made to pick up or deliver a package within the geofenced area.

If a cost per package parameter is assigned to the geofenced area (as determined at Block 405), the central system may, upon receipt of a request to ship a package from or to a location within the geofenced area (Block 501*d*), use the assigned cost per package to calculate a fee to charge for the shipment that more accurately reflects the cost to the carrier for the shipment (Block 502*d*).

While, in some embodiments, only one of the backup limit, speed limit or plan time may be defined for a particular geofenced area, in other embodiments any number and combination of parameters may be assigned to the geofenced area in accordance with embodiments of the present invention. These parameters may include any parameter which may be used, for example, to monitor safety within a geofenced area and/or assist in scheduling delivery of an item within the geofenced area. As a result, the foregoing examples are provided for exemplary purposes only and should not be taken in any way as limiting the scope of embodiments of the present invention to the examples provided.

CONCLUSION

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising one or more processors and one or more memory storage areas, the system configured to:
    associate a back-up limit with a geofenced area, the back-up limit indicating the number of times a vehicle is permitted to back up while operating within the geofenced area;

receive data collected in association with a vehicle, the data collected during operation of the vehicle within the geofenced area; and determine, based at least in part on the data collected, whether the back-up limit has at least been reached in the geofenced area.

2. The system of claim 1 further configured to, after a determination that the back-up limit has at least been reached in the geofenced area, generate an alert indicating that the back-up limit has at least been reached.

3. The system of claim 1, wherein the back-up limit corresponds to a zoning classification for the geofenced area.

4. The system of claim 3, wherein the zoning classification is selected from the group consisting of a commercial zoning classification and a residential zoning classification.

5. The system of claim 1, wherein the data collected comprises at least one of time data, geographic position data, speed data, distance data, or ignition data.

6. A method comprising:
associating, by one or more processors, a back-up limit with a geofenced area, the back-up limit indicating the number of times a vehicle is permitted to back up while operating within the geofenced area;

receiving, by the one or more processors, data collected in association with a vehicle, the data collected during operation of the vehicle within the geofenced area; and determining, by the one or more processors, based at least in part on the data collected, whether the back-up limit has at least been reached in the geofenced area.

7. The method of claim 6 further comprising, after a determination that the back-up limit has at least been reached in the geofenced area, generating an alert indicating that the back-up limit has at least been reached.

8. The method of claim 6, wherein the back-up limit corresponds to a zoning classification for the geofenced area.

9. The method of claim 8, wherein the zoning classification is selected from the group consisting of a commercial zoning classification and a residential zoning classification.

10. The method of claim 6, wherein the data collected comprises at least one of time data, geographic position data, speed data, distance data, or ignition data.

11. A computer program product comprising at least one non-transitory computer-readable storage medium having computer-readable program code portions stored therein, the computer-readable program code portions comprising:
an executable portion configured to associate a back-up limit with a geofenced area, the back-up limit indicating the number of times a vehicle is permitted to back up while operating within the geofenced area;

an executable portion configured to receive data collected in association with a vehicle, the data collected during operation of the vehicle within the geofenced area; and an executable portion configured to determine, based at least in part on the data collected, whether the back-up limit has at least been reached in the geofenced area.

12. The computer program product of claim 11 further comprising an executable portion configured to, after a determination that the back-up limit has at least been reached in the geofenced area, generate an alert indicating that the back-up limit has at least been reached.

13. The computer program product of claim 11, wherein the back-up limit corresponds to a zoning classification for the geofenced area.

14. The computer program product of claim 13, wherein the zoning classification is selected from the group consisting of a commercial zoning classification and a residential zoning classification.

15. The computer program product of claim 11, wherein the data collected comprises at least one of time data, geographic position data, speed data, distance data, or ignition data.

* * * * *